United States Patent
Barbu et al.

(10) Patent No.: US 11,997,627 B2
(45) Date of Patent: May 28, 2024

(54) PREDICTING CLOCK DRIFTING

(71) Applicant: NOKIA SOLUTIONS AND NETWORKS OY, Espoo (FI)

(72) Inventors: Oana-Elena Barbu, Aalborg (DK); Nuno Manuel Kiilerich Pratas, Gistrup (DK); Daniela Laselva, Klarup (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 13 days.

(21) Appl. No.: 17/993,557

(22) Filed: Nov. 23, 2022

(65) Prior Publication Data
US 2023/0199684 A1 Jun. 22, 2023

(30) Foreign Application Priority Data

Dec. 16, 2021 (FI) .................................. 20216285

(51) Int. Cl.
*H04W 56/00* (2009.01)
*H04L 7/00* (2006.01)

(52) U.S. Cl.
CPC ....... *H04W 56/0025* (2013.01); *H04L 7/0016* (2013.01); *H04W 56/0055* (2013.01)

(58) Field of Classification Search
None
See application file for complete search history.

(56) References Cited

U.S. PATENT DOCUMENTS

| | | | |
|---|---|---|---|
| 10,623,173 B1* | 4/2020 | Geng | H03L 7/093 |
| 11,063,738 B1 | 7/2021 | Wang | |
| 11,658,798 B1* | 5/2023 | Kratz | H04L 7/0016 |
| | | | 375/368 |
| 11,863,298 B1* | 1/2024 | Kratz | H04J 3/0658 |
| 2011/0268097 A1* | 11/2011 | Agrawala | G01S 5/0289 |
| | | | 370/350 |
| 2016/0262122 A1* | 9/2016 | Aldana | H04W 24/10 |
| 2016/0342903 A1 | 11/2016 | Shumpert | |
| 2016/0374043 A1* | 12/2016 | Wetterwald | H04W 56/0045 |
| 2019/0207695 A1 | 7/2019 | Aweya | |
| 2019/0246367 A1 | 8/2019 | Vilajosana et al. | |
| 2020/0106542 A1 | 4/2020 | Liu | |
| 2023/0009717 A1* | 1/2023 | Bilstad | G01S 5/0284 |
| 2023/0032215 A1* | 2/2023 | Prasanna | H04W 52/0209 |

OTHER PUBLICATIONS

Office Action—Communication of Acceptance dated Dec. 7, 2023 corresponding to Finnish Patent Application No. 20216285.

(Continued)

*Primary Examiner* — Anh Vu H Ly
(74) *Attorney, Agent, or Firm* — Squire Patton; BOGGS (US) LLP

(57) ABSTRACT

Disclosed is a method comprising obtaining a plurality of previous clock skews, a reported temperature and a reported time, based on the plurality of previous clock skews, the reported temperature and the reported time, obtaining a prediction of the current clock skew, determining a current clock offset based on the predicted current clock skew, determining a clock adjustment based on the current clock offset and the reported time, and determining a corrected time based on the clock adjustment.

11 Claims, 5 Drawing Sheets

(56) References Cited

OTHER PUBLICATIONS

Extended European Search Report dated May 15, 2023, corresponding to European Patent Application No. 22207816.4.

Huan Xintao et al: "NISA: Node Identification and Spoofing Attack Detection Based on Clock Features and Radio Information for Wireless Sensor Networks", IEEE Transactions on Communications, IEEE Service Center, Piscataway, NJ. USA, vol. 69, No. 7, Apr. 7, 2021 (Apr. 7, 2021), pp. 4691-4703.

Office Action dated Aug. 17, 2022 corresponding to Finnish Patent Application No. 20216285.

Finnish Search Report dated Aug. 17, 2022 corresponding to Finnish Patent Application No. 20216285.

A. Mahmood et al., "Time synchronization in 5G wirelss edge: requirements and solutions for critical MTC," In: IEEE Communications Magazine, Dec. 2019, pp. 45-51.

* cited by examiner

PREDICTING CLOCK DRIFTING

CROSS REFERENCE TO RELATED APPLICATION

This application claims the benefit of Finnish Patent Application No. 20216285, filed Dec. 16, 2021. The entire content of the above-referenced application is hereby incorporated by reference.

FIELD

The following exemplary embodiments relate to wireless communication and handling clock drifting within a cellular communication network.

BACKGROUND

Cellular communication networks comprise a plurality of network nodes. To allow communication to be reliable and timely, the clocks of the network nodes are to be synchronized to enable the notion of the time to be common to all network nodes.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising: means for obtaining a plurality of previous clock skews, a reported temperature and a reported time, means for, based on the plurality of previous clock skews, the reported temperature and the reported time, obtaining a prediction of the current clock skew, means for determining a current clock offset based on the predicted current clock skew, means for determining a clock adjustment based on the current clock offset and the reported time, and means for determining a corrected time based on the clock adjustment.

According to a second aspect there is provided an apparatus comprising at least one processor, and at least one memory including a computer program code, wherein the at least one memory and the computer program code are configured, with the at least one processor, to cause the apparatus to: obtain a plurality of previous clock skews, a reported temperature and a reported time, based on the plurality of previous clock skews, the reported temperature and the reported time, obtain a prediction of the current clock skew, determine a current clock offset based on the predicted current clock skew, determine a clock adjustment based on the current clock offset and the reported time, and determine a corrected time based on the clock adjustment.

According to a third aspect there is provided a method comprising obtaining a plurality of previous clock skews, a reported temperature and a reported time, based on the plurality of previous clock skews, the reported temperature and the reported time, obtaining a prediction of the current clock skew, determining a current clock offset based on the predicted current clock skew, determining a clock adjustment based on the current clock offset and the reported time, and determining a corrected time based on the clock adjustment.

According to a fourth aspect there is provided a computer program comprising instructions for causing an apparatus to perform at least the following: obtain a plurality of previous clock skews, a reported temperature and a reported time, based on the plurality of previous clock skews, the reported temperature and the reported time, obtain a prediction of the current clock skew, determine a current clock offset based on the predicted current clock skew, determine a clock adjustment based on the current clock offset and the reported time, and determine a corrected time based on the clock adjustment.

According to a fifth aspect there is provided a computer program product comprising instructions for causing an apparatus to perform at least the following: obtain a plurality of previous clock skews, a reported temperature and a reported time, based on the plurality of previous clock skews, the reported temperature and the reported time, obtain a prediction of the current clock skew, determine a current clock offset based on the predicted current clock skew, determine a clock adjustment based on the current clock offset and the reported time, and determine a corrected time based on the clock adjustment.

According to a sixth aspect there is provided a computer program comprising instructions stored thereon for performing at least the following: obtain a plurality of previous clock skews, a reported temperature and a reported time, based on the plurality of previous clock skews, the reported temperature and the reported time, obtain a prediction of the current clock skew, determine a current clock offset based on the predicted current clock skew, determine a clock adjustment based on the current clock offset and the reported time, and determine a corrected time based on the clock adjustment.

According to a seventh aspect there is provided a non-transitory computer readable medium comprising program instructions for causing an apparatus to perform at least the following: obtain a plurality of previous clock skews, a reported temperature and a reported time, based on the plurality of previous clock skews, the reported temperature and the reported time, obtain a prediction of the current clock skew, determine a current clock offset based on the predicted current clock skew, determine a clock adjustment based on the current clock offset and the reported time, and determine a corrected time based on the clock adjustment.

According to an eight aspect there is provided non-transitory computer readable medium comprising program instructions stored thereon for performing at least the following: obtain a plurality of previous clock skews, a reported temperature and a reported time, based on the plurality of previous clock skews, the reported temperature and the reported time, obtain a prediction of the current clock skew, determine a current clock offset based on the predicted current clock skew, determine a clock adjustment based on the current clock offset and the reported time, and determine a corrected time based on the clock adjustment.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
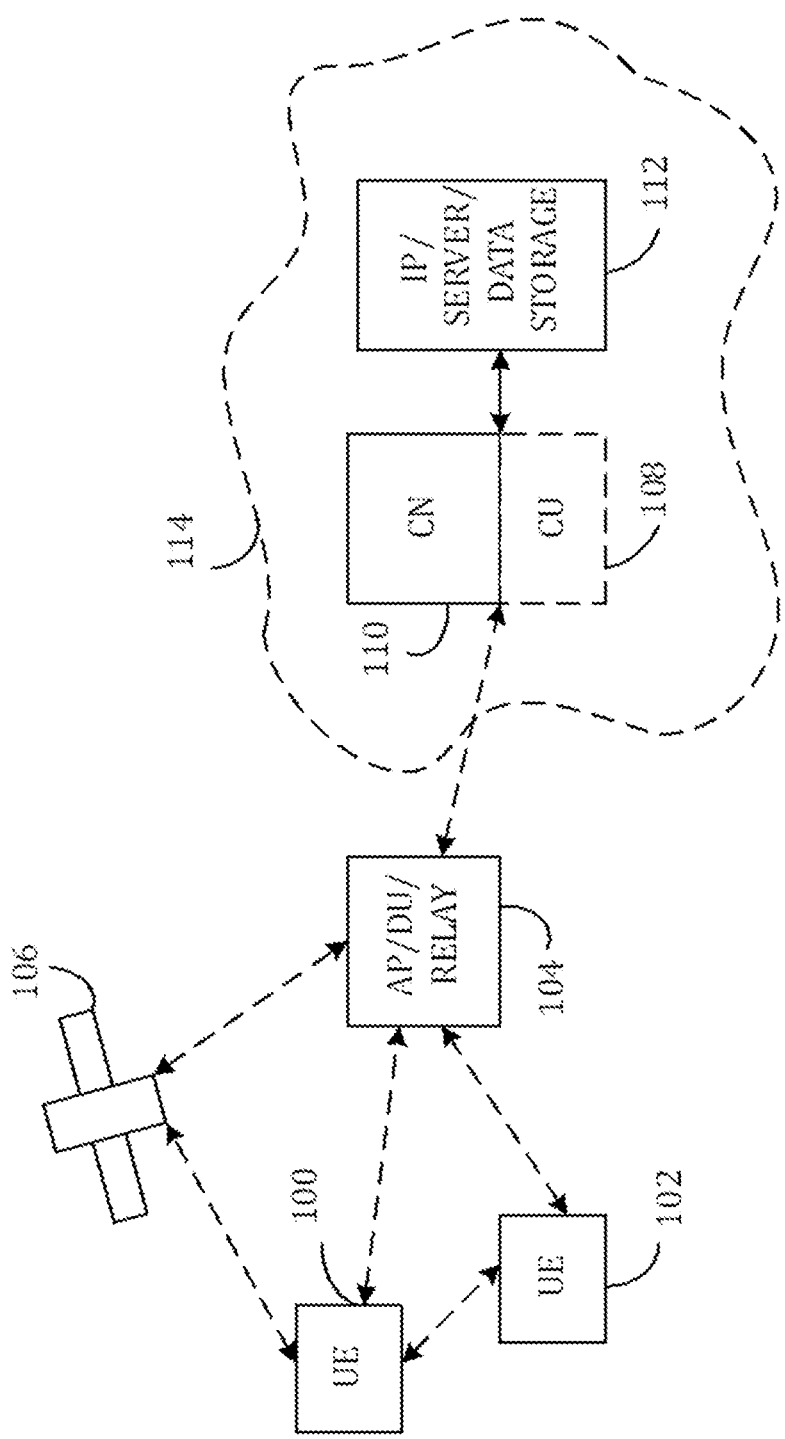

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The wireless link from a terminal device to a (e/g)NodeB is called uplink or reverse link and the wireless link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g) NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SD N). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Possible use cases comprise providing service continuity for machine-to-machine (M2M) or Internet of Things (IoT) devices or for passengers on board of vehicles, and/or ensuring service availability for critical communications, and/or future railway/maritime/aeronautical communications. Satellite communication may utilise geostationary earth orbit (GEO) satellite systems, but also low earth orbit (LEO) satellite systems, for example, mega-constellations (systems in which hundreds of (nano) satellites are deployed). A satellite 106 comprised in a constellation may carry a gNB, or at least part of the gNB, that create on-ground cells. Alternatively, a satellite 106 may be used to relay signals of one or more cells to the Earth. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized. HAPS may be understood as radio stations located on an object at an altitude of 20-50 kilometres and at a fixed point relative to the Earth. Alternatively, HAPS may also move relative to the Earth. For example, broadband access may be delivered via HAPS using lightweight, solar-powered aircraft and airships at an altitude of 20-25 kilometres operating continually for several months for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

Devices, such as access nodes and terminal devices, that communicate with each other in a wireless cellular communication network may be referred to as radios that may form a transmit-receive pair and they may perform the transmission and reception in accordance with the 3GPP standards. To enable accurate transmission and reception clock synchronization, which refers to the procedure through which the radios that are part of the wireless cellular communication network have and maintain the same notion of time, is required. This requirement is applicable to procedures that are required to establish and maintain communication between various radios such as gNB and/or terminal device in various radio access technologies (RATs), such as 5G. For example, 5G applications such as small data transmission (SDT), ranging and industrial internet of things (IIoT) applications, require an accurate timing advance (TA), which requires tight clock synchronization. Also, power management, such as duty cycling, localization, security, tracking, and/or extended reality (XR) applications and/or any other type of time sensitive network (TSN) deployments require tight clock synchronization.

A clock of a device, such as a radio, that is comprised in a wireless cellular communication network comprises a periodic component such as an oscillator and the accuracy of the clock oscillators comprised in the wireless cellular communication network affect clock synchronization. Additionally, also device size, cost, power supply operating temperature etc. may affect the clock synchronization. As a results, a clock drift is a phenomenon that is ubiquitous and affect all radios such as all radios of a 5G network. Clock drift may cause a transmit-receive radio pair to sample a signal at different rates and instances, which may then cause loss of information due to misalignment and wrong sampling of the signal. To avoid these issues, clock drift may be compensated for example by having a terminal device to become synchronized with the network by listening to the DL cellular synchronization signals and from there extract the correct time and frequency to be used to communicate with the cellular system. This synchronization procedure applies a phase compensation to the clock comprised in the terminal device thereby allowing the terminal device to correct the clock drift. Yet, in case the terminal device moves to a different physical location, this synchronization procedure then causes both the clock drift and also a time shift due to the movement of the terminal device. As a consequence, the terminal device may have an invalid TA for its uplink transmission caused by the movement of the terminal device. This can be avoided if the network is able to adjust for the TA difference, which however is not the case when the terminal device is in an RRC-inactive state.

In addition to the periodic component, the clock also comprises a counting component such as a hardware register. The periodic component and the counting component combined determine a resolution for the clock. The resolution may be understood as the smallest measurable time unit determined by the combination. A clock drift may be understood as the clock not running at the correct speed compared to the actual time. Different clocks may drift differently compared to each other and the clock drift may be dependent on factors mentioned above. Thus, even one clock may drift differently in different conditions. A clock skew and offset may be used to characterize the clock drift. The instantaneous clock drift rate may be called clock skew and the time difference with the actual time may be called clock offset.

If the time that is reported by a clock comprised in a radio, that is a wireless radio, indexed k at some ideal time t is $C_k(t)$, then the difference between the time of an ideal clock t and a given clock k is said to be the offset, which may be defined as:

$$\theta_k(t) = C_k(t) - t.$$

Different radios may have different offsets, and in order to operate under a common time, they are to obtain an estimate for compensating for their offsets $\hat{\theta}_k(t)$ such that the time of each radio k matches the ideal time, i.e. $\hat{t}_k = C_k(t) - \hat{\theta}_k(t) \approx t, \forall k$.

Such compensation may have effects such as preventing misalignments in a frame indexing becoming so severe that entire frames may be lost or rendered unusable, which may severely degrade the performance of the data transmission. Further, ranging operations may be prevented from becoming compromised as the localization uncertainty may be prevented from increasing possibly up to hundreds of meters. Also further, cooperative services which require information exchange between multiple network nodes may also be prevented from being rendered useless due to their data transmissions not being successfully combined, etc.

Some 5G, or future generation such as 6G, related applications, such as SDT, IIoT and XR localization may have accurate clock synchronization as a prerequisite. For example, such applications may require synchronization accuracy in the order of tens of picoseconds. Therefore, the synchronization of gNBs, in case of 5G as in this example, is to be close to perfectly synchronized to allow for centimeter level accuracy of 5G based localization and/or joint MIMO transmission schemes in which the transmitters are not collocated in the same hardware, such as joint transmission (JT) MIMO. To address such requirement, the below exemplary embodiments discuss examples of forecasting the clock drift of an 5G radio, such as a gNB, any transmission-reception point (TRP) or a terminal device.

Figure 2:
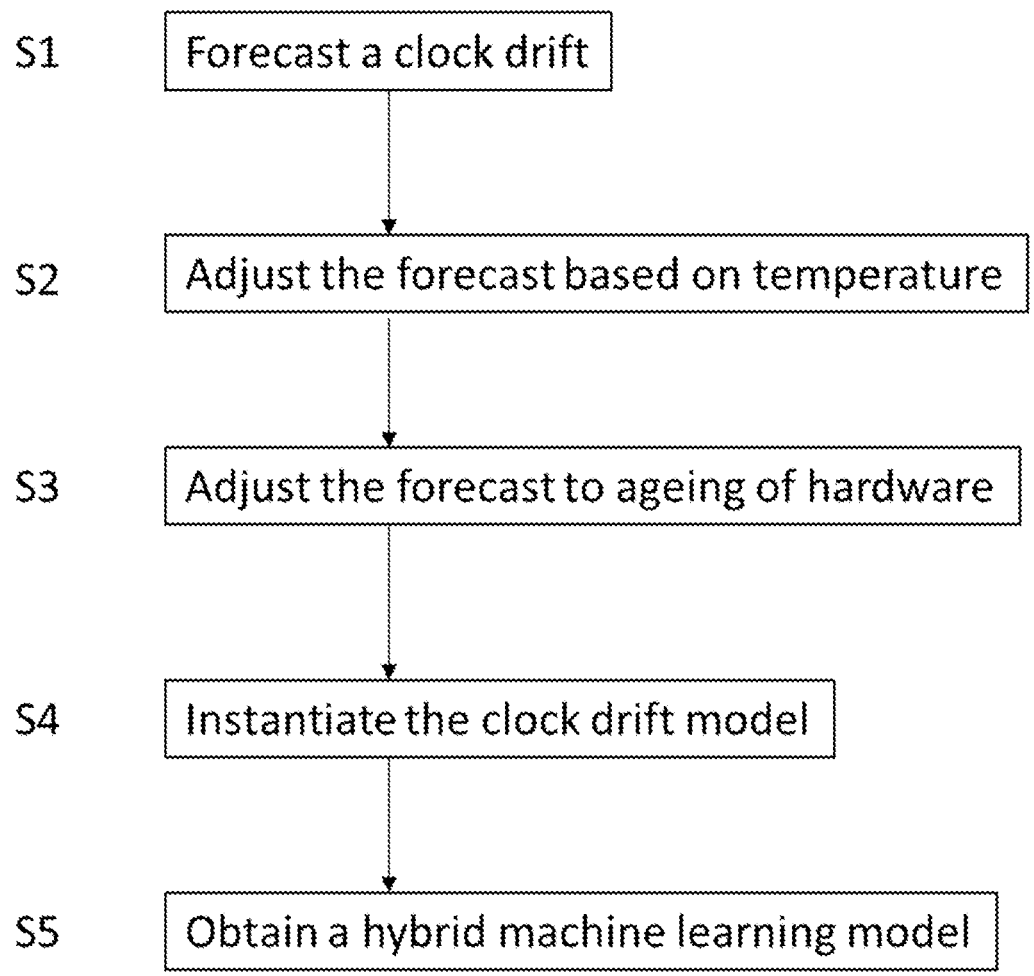
FIG. 2 illustrates a flow chart according to an exemplary embodiment.

FIG. 2 illustrates a flow chart according to an exemplary embodiment in which the clock drift is forecasted. In this exemplary embodiment the clock drift is first predicted and then subsequently used for a drift compensation to adjust the reported clock values to the true clock. It is to be noted that reported clock values can also be referred to as reported time values. The first step in this exemplary embodiment, S1, comprises applying a machine-learning (ML) model that forecasts the clock drift by posing a tunable clock drift model, which can then be followed by a robust clock drift prediction. The machine learning model may be tailor-made and may utilize any suitable machine learning model, such as deep neural networks, ResNet, convolutional neural networks, etc. Next, in S2, the effects of temperature are modeled and taken into account based on the modelling by correspondingly adjusting the forecasted drift. Then in S3, the effects of hardware (HW) ageing are taken into account. As a result of ageing, HW imperfections increase, and the forecast may be refined over time to ensure robustness to the increase of the HW imperfections. Then in S4, the clock drift model may be instantiated with various degrees of complexity. This allows trading complexity for performance. Finally, in S5, the model is trained in conjunction with a subsequent clock adjustment, to obtain a hybrid ML model.

Figure 3:
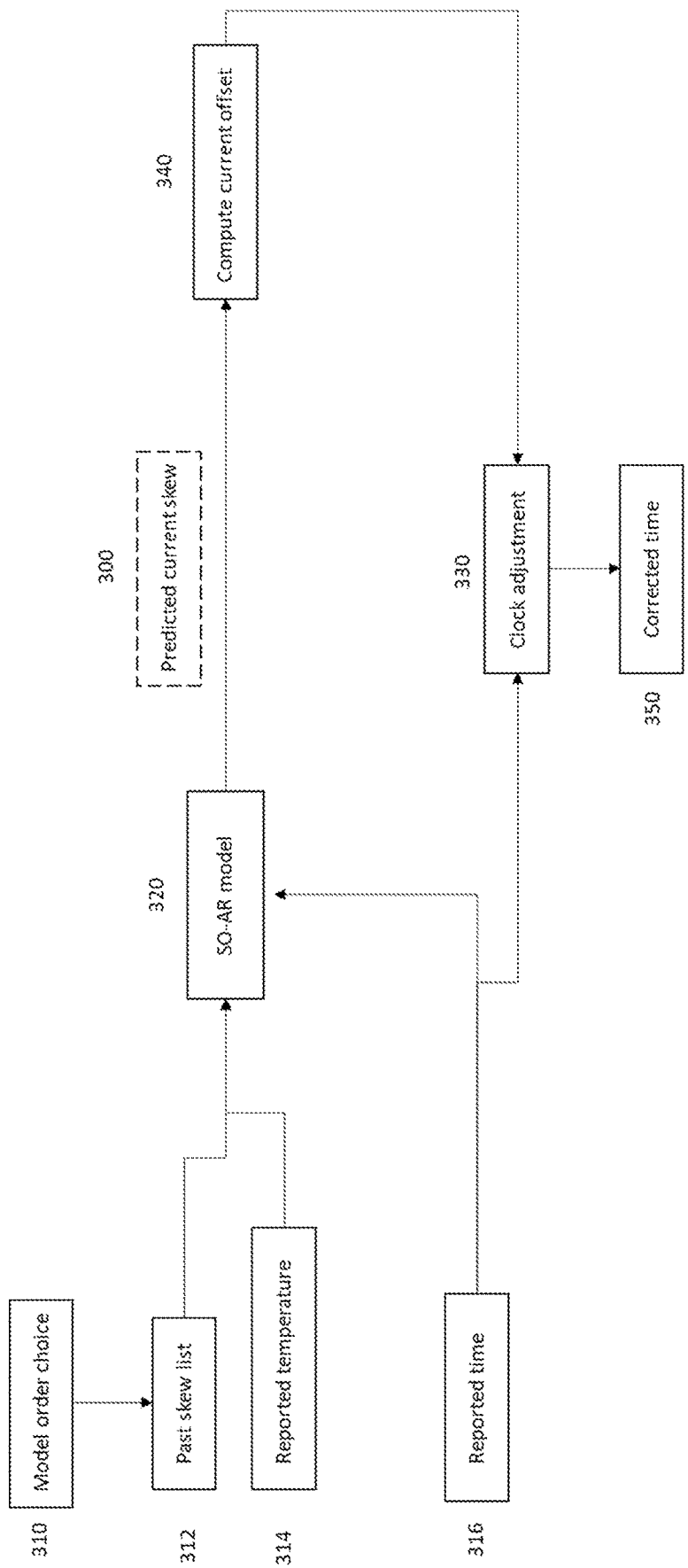
FIG. 3 illustrates an exemplary embodiment of an architecture for machine-learning aided clock drift prediction.

FIG. 3 illustrates an exemplary embodiment in which an architecture for machine-learning aided clock drift prediction is illustrated. As mentioned previously, a clock drift may be characterized by a clock skew and an offset. An instantaneous clock drift rate may be called as a clock skew and the time difference with the actual time may be called as a clock offset. Also, as mentioned above, if the time reported, by a clock, at some ideal time t is written as C(t), then the difference between the time of an ideal clock t and a given clock, the clock offset, is defined as:

$$\theta(t)=C(t)-t \quad (1)$$

An oscillator in the clock produces periodic pulses and a difference between the rate, at which these pulses are produced, and the rate, at which an ideal clock counts the desired interval, is called the skew and denoted by:

$$\alpha(t) = \frac{d\theta(t)}{dt} \quad (2)$$

Thus, the clock variations may be decomposed into three independent components:
1. the instantaneous clock skew $\alpha(t)$,
2. the initial clock offset $\theta_0$, and
3. the random measurement and other types of additive noise w(t).

Subsequently, the instantaneous clock offset at time t may be given as:

$$\theta(t)=\int_0^t \alpha(\tau)d\tau+\theta_0+w(t) \quad (3)$$

A continuous-time model becomes a discrete-time model after sampling has been performed, and a discrete clock model may be desirable as the synchronization may be obtained through time-stamped message exchange. Thus, based on the equation (2), the discrete-time clock model at time index n may be obtained as:

$$\theta_n = \sum_{k=1}^{n} \alpha_k \tau_k + \theta_0 + w_n \quad (4)$$

in which k is the sample index, and $\tau_k$ is the sampling period at the k-th sample. The model may now be re-written using a recursive form as:

$$\theta_n=\theta_{n-1}+\alpha_n\tau_n+w_n \quad (5)$$

If the instantaneous clock offset is known, or alternatively, is estimated, i.e. an approximation $\widehat{\theta_n}\approx\theta_n$ is found, then it can be compensated for by applying the equation (1) and determining the correct time as:

$$\widehat{t_n}=C_n-\widehat{\theta_n} \quad (A)$$

Next, an example of an estimation model for equation (4) is derived. This allows to estimate a subsequent clock offset. In this exemplary embodiment, it is assumed that a sampling rate is fixed, such as uniform sampling with $\tau_n=\tau_0, \forall n>0$, and that the sampling period is known.

Thus, if $\widetilde{\theta_n}$ is the true time offset, that is:

$$\widetilde{\theta_n} \approx \widetilde{\theta_{n-1}}+\alpha_n\tau_0 \quad (6)$$

Then U observations may be collected of the time offset and determine the differential offsets $\delta\widetilde{\theta_n}$:

$$\delta\widetilde{\theta_n}=(\widetilde{\theta_n}-\widetilde{\theta_{n-1}})\tau_0\approx\alpha_n, n=0:U-1 \quad (7)$$

After the observations in (7) have been collected, a model for the clock skew may be obtained such that a prediction of $\alpha_p, \forall p>n$ can determined. It is to be noted that determining may also be understood as computing or calculating. After this the clock offset may be predicted using the equation (6) and then corrected using the equation (A) to obtain the true time.

Additionally, the estimation model may be developed further by using the following assumptions: An autoregressive model of order V<<U for the skew, i.e. $\alpha_n=f(\alpha_{n-i}, i=1:V)$, and the skew is temperature $T_n$ dependent: $\alpha_n=f(\alpha_{n-i}, T_n, i=1:V)$ As is illustrated in FIG. 3, after the assumptions mentioned above, a single output autoregressive (SO-AR) time series forecasting may be applied. In other words, there is a SO-AR model block 320 in the block diagram of the FIG. 3 illustrating the SO-AR modelling. In this exemplary embodiment it is based on machine learning for the instantaneous skew $\alpha_n$, having:
1. Observed and/or estimated the past skews $\widehat{\alpha_{n-k}}$, k=1:V obtained with (7),
2. Current reported time $C_n$ and,
3. Current observed temperature $T_n$.

This is also illustrated in the FIG. 3 such that there is a block 310 illustrating model order choice, block 312 illustrating a list of past skews in accordance with the feature (1) listed above. A list of past skews may also be understood as a plurality of previous skews. There is also block 314 illustrating feature (3) listed above, which illustrates the reported temperature that is the current observed temperature and there is block 316 illustrating feature (2) listed above, which illustrates the reported time that is the current reported time. The blocks 310, 312, 314 and 316 are then used as an input for the SO-AR model illustrated by the block 320.

In this exemplary embodiment, if the machine learning model that is applied is a neural network (NN), then the features (1)-(3) can be used as input to the NN to output $\widehat{\alpha_n}$, which is the predicted current skew illustrated by the block 300. The NN may be of any suitable type, such as long short-term memory (LSTM), recurrent neural network (RNN), or a convolutional neural network (CNN). The NN may be preceded by a standard data preparation such as missing features removal, normalization etc. It is also to be noted that instead of a NN, any other suitable supervised learning could also be utilized.

As the prediction model is now obtained for the clock skew, the clock offset can then be reconstructed at any future time moment z, $\widetilde{\theta}_z$ using equation (6) by replacing n by z. Then the clock may be adjusted using (A) as $\hat{t}_z = C(z) - \widetilde{\theta}_z$. This is illustrated in the FIG. 3 such that block 340 illustrates determining the current clock offset based on the predicted current clock skew illustrated by the block 300. In other words, the block 300 illustrates prediction of the current skew. Then, based on the current clock skew and the reported time, clock adjustment is performed as illustrated by the block 330. Based on the clock adjustment, the corrected time is then obtained as illustrated in block 350.

Figure 4:
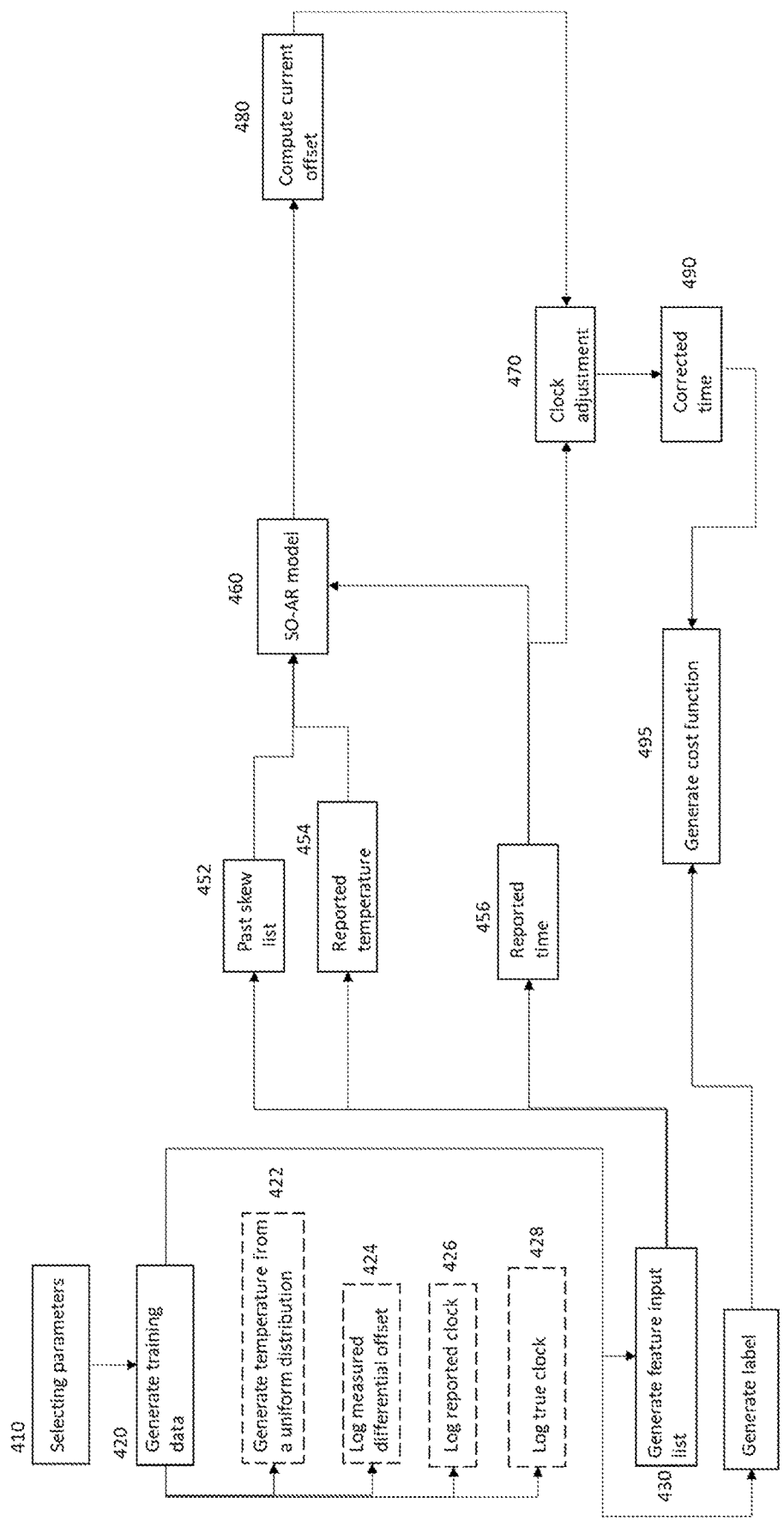
FIG. 4 illustrates an exemplary embodiment of training a machine learning model.

FIG. 4 illustrates an exemplary embodiment of a block architecture for training a machine learning model such as the one described previously for the clock adjustment. First, as illustrated by the block 410, parameters for training, in other words, training data for the machine learning model, are selected and then U training data samples are generated, as illustrated by block 420, which corresponds to the features (1)-(3) discussed above, for a temperature drawn uniformly from a range $[T_m, T_M]$. For example, the training data samples may be extracted from a reference device that is subjected to different values of temperature and the values for the temperature are thus drawn from the uniform distribution of the values of the temperature, that is, from the range $[T_m, T_M]$. This is illustrated by the block 422. Then, each V+1 sample set is split into the first V samples used as training features, in other words as an input as illustrated in block 430, and the V+1-th sample used for the label, in other words as the output, as illustrated by the block 440. It is to be noted that the training data may also be used to tune the baseline model for complexity, that is, different architectures may be trained for different model orders, by varying V in a selected range [1, Vmax], such as Vmax=10.

Optionally, the generated training data batches may further comprise samples such as logged measured differential offset, as illustrated by block 424. This may be obtained using the equation (7) described above. The generated training data may optionally also comprise logged reported clock, as illustrated by block 426 and logged true clock, as illustrated by block 428.

Inputs from the block 430 may then be obtained by the block 452 that illustrates a past skew list, by the block 454 that illustrates the reported temperature that may be the reported room temperature, and by the block 456 that illustrates the reported time. Block 460 then illustrates the SO-AR model, which may correspond to the SO-AR model of the exemplary embodiment of FIG. 3, and it receives as input the past skew list, the reported temperature and the reported time. Based on the SO-AR model the current clock offset is then determined as illustrated in block 480. Based on the current clock offset and the reported time, the clock adjustment is then performed as illustrated in block 470 and based on the clock adjustment, the corrected time is obtained as illustrated in block 490.

Then, the cost function, illustrated by the block 495, at the output of the correction block 490, may be generated by determining it as the mean square error (MSE) between the ideal time and the corrected one, i.e. $C = MSE(t, \hat{t})$ and that cost function may be backpropagated through the structure depicted of the training architecture.

In this exemplary embodiment the training is implemented at the network side, and the solution may be deployed in any NR radio, such as at a gNB side, at a TRP, at any network relay node and/or at any terminal device. It is also to be noted that training data for the machine learning model may be extracted in any suitable manner, for example, from a reference device or from a simulated device.

As mentioned above, the clock drift is impacted by the age of the build-in oscillators. Thus, it is beneficial to retrain the architecture periodically, in order to capture the ageing effects. Therefore, the training architecture, such as in this exemplary embodiment, may be activated at regular time intervals, for example at order of months, or on demand, when systematic anomalies are detected, for example at regular spikes in the number of the TA adjustment requests coming from the network which do not correlate with the speed of a terminal device may indicate poor clock drift compensation.

Using the exemplary embodiment described above it is possible to harnesses power of so called big data in obtaining an evolving clock compensation model. Such model may have advantages such as being robust to HW imperfections and ageing, a flexible implementation, for example performance and complexity can be jointly optimized through the selection of the model order, and a constantly evolving model, for example variable model order, to adapt to both intrinsic and extrinsic variable factors such as temperature.

Figure 5:
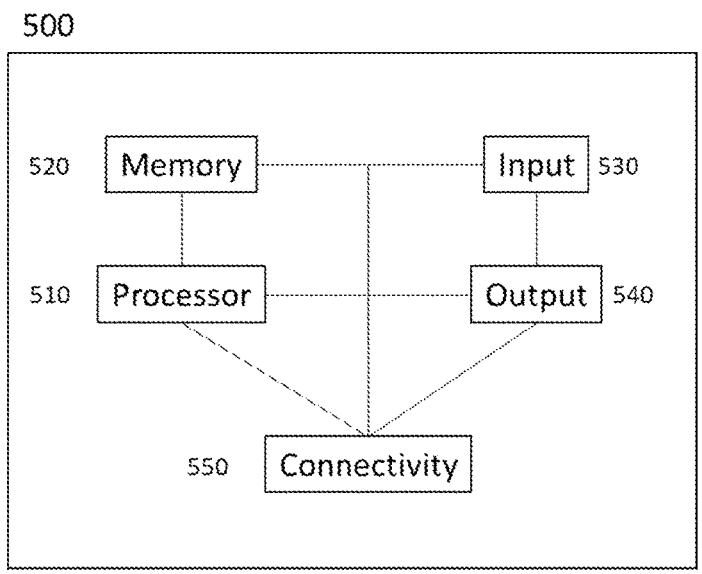
FIG. 5 and FIG. 6 illustrate exemplary embodiments of an apparatus.

FIG. 5 illustrates an apparatus 500, which may be an apparatus such as, or comprised in, a terminal device, according to an example embodiment. The apparatus 500 comprises a processor 510. The processor 510 interprets computer program instructions and processes data. The processor 510 may comprise one or more programmable processors. The processor 510 may comprise programmable hardware with embedded firmware and may, alternatively or additionally, comprise one or more application specific integrated circuits, ASICs.

The processor 510 is coupled to a memory 520. The processor is configured to read and write data to and from the memory 520. The memory 520 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 520 stores computer readable instructions that are execute by the processor 510. For example, non-volatile memory stores the computer readable instructions and the processor 510 executes the instructions using volatile memory for temporary storage of data and/or instructions.

The computer readable instructions may have been pre-stored to the memory 520 or, alternatively or additionally, they may be received, by the apparatus, via electromagnetic carrier signal and/or may be copied from a physical entity such as computer program product. Execution of the computer readable instructions causes the apparatus 500 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 500 further comprises, or is connected to, an input unit 530. The input unit 530 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 530 may comprise an interface to which external devices may connect to.

The apparatus 500 also comprises an output unit 540. The output unit comprises or is connected to one or more displays capable of rendering visual content such as a light emitting diode, LED, display, a liquid crystal display, LCD and a liquid crystal on silicon, LCoS, display. The output unit 540 further comprises one or more audio outputs. The one or more audio outputs may be for example loudspeakers or a set of headphones.

The apparatus 500 may further comprise a connectivity unit 550. The connectivity unit 550 enables wired and/or wireless connectivity to external networks. The connectivity unit 550 may comprise one or more antennas and one or more receivers that may be integrated to the apparatus 500 or the apparatus 500 may be connected to. The connectivity unit 550 may comprise an integrated circuit or a set of integrated circuits that provide the wireless communication capability for the apparatus 500. Alternatively, the wireless connectivity may be a hardwired application specific integrated circuit, ASIC.

It is to be noted that the apparatus 500 may further comprise various component not illustrated in the FIG. 5. The various components may be hardware component and/or software components.

Figure 6:
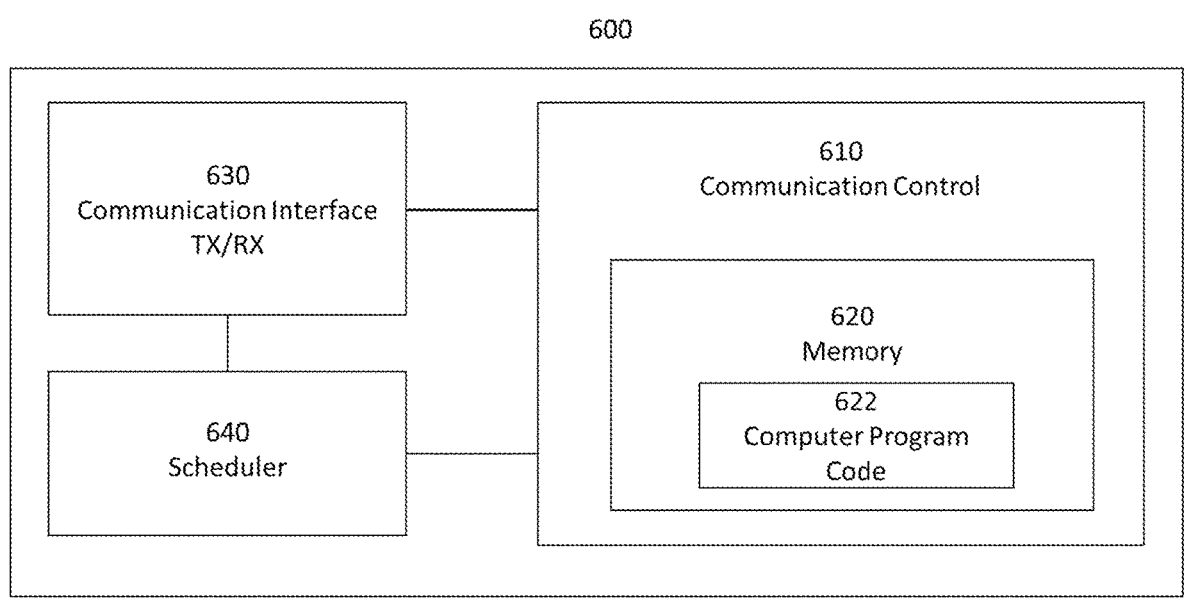

The apparatus 600 of FIG. 6 illustrates an example embodiment of an apparatus that may be an access node or be comprised in an access node. The apparatus may be, for example, a circuitry or a chipset applicable to an access node to realize the described embodiments. The apparatus 600 may be an electronic device comprising one or more electronic circuitries. The apparatus 600 may comprise a communication control circuitry 610 such as at least one processor, and at least one memory 620 including a computer program code (software) 622 wherein the at least one memory and the computer program code (software) 622 are configured, with the at least one processor, to cause the apparatus 600 to carry out any one of the example embodiments of the access node described above.

The memory 620 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 600 may further comprise a communication interface 630 comprising hardware and/or software for realizing communication connectivity according to one or more communication protocols. The communication interface 630 may provide the apparatus with radio communication capabilities to communicate in the cellular communication system. The communication interface may, for example, provide a radio interface to terminal devices. The apparatus 600 may further comprise another interface towards a core network such as the network coordinator apparatus and/or to the access nodes of the cellular communication system. The apparatus 600 may further comprise a scheduler 640 that is configured to allocate resources.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor; and
at least one memory including computer program code, wherein the at least one memory and the computer program code are configured, with the at least one processor, to cause the apparatus to:
obtain a plurality of previous clock skews, a reported temperature and a reported time;
based on the plurality of previous clock skews, the reported temperature and the reported time, obtain a prediction of a current clock skew, wherein the prediction is obtained using a machine learning model and a training data for the machine learning model is extracted from a reference device when the reference device is subjected to different temperatures, and wherein values of the temperatures are drawn from a uniform distribution of values of the temperatures;
determine a current clock offset based on the predicted current clock skew;
determine a clock adjustment based on the current clock offset and the reported time; and
determine a corrected time based on the clock adjustment.

2. The apparatus according to claim 1, wherein the machine learning model is comprised in a single output autoregression model.

3. The apparatus according to claim 1, wherein the machine learning model comprises a supervised machine learning model.

4. The apparatus according to claim 1, wherein the machine learning model is trained in conjunction with the obtained clock adjustment.

5. The apparatus according to claim 1, wherein the machine learning model is retrained at regular time intervals.

6. The apparatus according to claim 1, wherein the machine learning model is retrained when systematic anomalies are detected.

7. The apparatus according to claim 1, wherein the apparatus is further caused to obtain the machine learning model.

8. A method, comprising:
obtaining a plurality of previous clock skews, a reported temperature and a reported time;
based on the plurality of previous clock skews, the reported temperature and the reported time, obtaining a prediction of a current clock skew, wherein the prediction is obtained using a machine learning model and a training data for the machine learning model is extracted from a reference device when the reference device is subjected to different temperatures, and wherein values of the temperatures are drawn from a uniform distribution of values of the temperatures;
determining a current clock offset based on the predicted current clock skew;
determining a clock adjustment based on the current clock offset and the reported time; and
determining a corrected time based on the clock adjustment.

9. The method according to claim 8, wherein the machine learning model is trained in conjunction with the obtained clock adjustment.

10. The method according to claim 8, wherein the machine learning model is retrained when systematic anomalies are detected and/or at regular time intervals.

11. A non-transitory computer readable medium comprising program instructions which, when executed on an apparatus, cause the apparatus to perform at least the following:
obtain a plurality of previous clock skews, a reported temperature and a reported time;
based on the plurality of previous clock skews, the reported temperature and the reported time, obtain a prediction of a current clock skew, wherein the prediction is obtained using a machine learning model and a training data for the machine learning model is extracted from a reference device when the reference device is subjected to different temperatures, and wherein values of the temperatures are drawn from a uniform distribution of values of the temperatures;
determine a current clock offset based on the predicted current clock skew;
determine a clock adjustment based on the current clock offset and the reported time; and
determine a corrected time based on the clock adjustment.

* * * * *